(12) United States Patent
Noguchi

(10) Patent No.: US 8,049,842 B2
(45) Date of Patent: Nov. 1, 2011

(54) DISPLAY APPARATUS

(75) Inventor: Koji Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 229 days.

(21) Appl. No.: 12/140,791

(22) Filed: Jun. 17, 2008

(65) Prior Publication Data

US 2009/0015762 A1    Jan. 15, 2009

(30) Foreign Application Priority Data

Jul. 9, 2007    (JP) .................................. 2007-179388

(51) Int. Cl.
*G02F 1/1333*    (2006.01)

(52) U.S. Cl. ............................ 349/96; 349/141; 349/142

(58) Field of Classification Search .................... 349/96, 349/141–142

See application file for complete search history.

(56) References Cited

U.S. PATENT DOCUMENTS

| 5,082,353 | A | * | 1/1992 | Kawasaki | ................. | 349/117 |
| 2004/0263748 | A1 | * | 12/2004 | Park et al. | ................. | 349/141 |
| 2005/0099567 | A1 | * | 5/2005 | Shimizu et al. | ................. | 349/141 |
| 2007/0035675 | A1 | * | 2/2007 | Um et al. | ................. | 349/43 |

FOREIGN PATENT DOCUMENTS

JP    2001-056474    2/2001

* cited by examiner

*Primary Examiner* — Phu Vu

(74) *Attorney, Agent, or Firm* — SNR Denton US LLP

(57) ABSTRACT

A display apparatus includes a liquid crystal panel including a pair of substrates and a liquid crystal layer sandwiched between the substrates; a polarizing plate provided on the side of the liquid crystal panel from which display light is to be extracted; and a common electrode and a plurality of pixel electrodes disposed in an insulating state on a face of one of the substrates adjacent the liquid crystal layer. The transmission axis of the polarizing plate extends obliquely with respect to outer peripheral sides of a display screen. Each pixel electrode has a substantially quadrilateral outer shape having two major sides substantially parallel or perpendicular to the transmission axis of the polarizing plate. Each pixel electrode has plural electrode portions extending in parallel to the major sides of the outer shape of the pixel electrode in the outer shape.

8 Claims, 12 Drawing Sheets

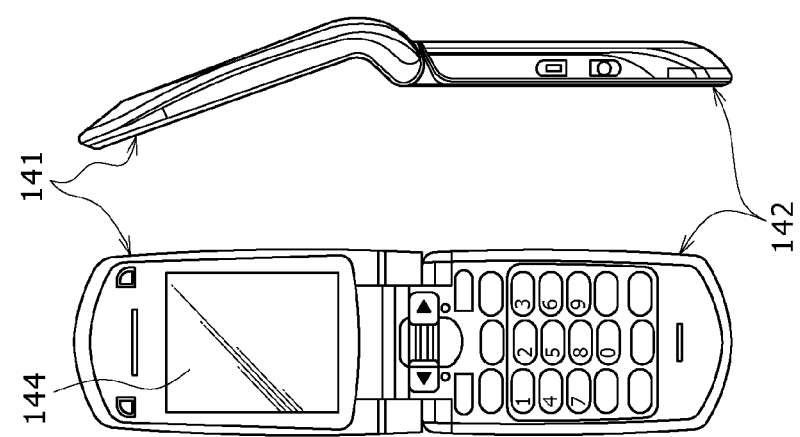
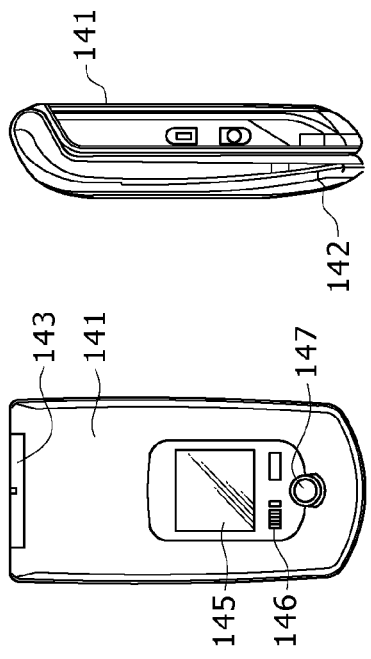
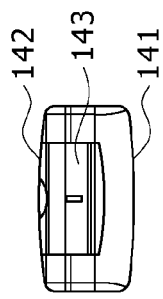
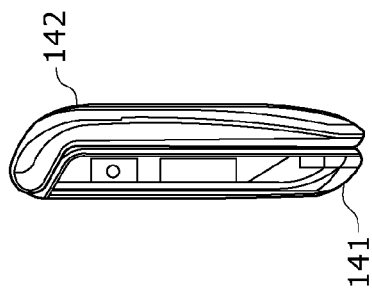
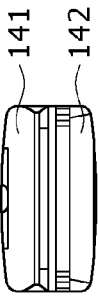

UPON APPLICATION OF NO VOLTAGE(BLACK)    UPON APPLICATION OF VOLTAGE(WHITE)

DISPLAY APPARATUS

CROSS REFERENCES TO RELATED APPLICATIONS

The present invention contains subject matter related to Japanese Patent Application JP 2007-179388 filed with the Japan Patent Office on Jul. 9, 2007, the entire contents of which being incorporated herein by reference.

BACKGROUND OF THE INVENTION

1. Field of the Invention

This invention relates to a display apparatus, and particularly to a display apparatus wherein liquid crystal molecules are driven in an in-plane switching mode.

2. Description of the Related Art

A liquid crystal display apparatus of an in-plane switching mode attracts attention as a liquid crystal mode which implements a wide viewing angle and a high contrast. FIG. 13 illustrates operation of a liquid crystal display apparatus of a fringe field switching (FFS) mode which is one of in-plane switching modes. In FIG. 13, an optical axis is indicated by a double-sided arrow mark.

Referring to FIG. 13, the liquid crystal display apparatus of the FFS mode shown includes a common electrode 201 provided on a driving substrate not shown. Electrode portions 202a of a pixel electrode 202 are formed by patterning on the common electrode 201 with an insulating film interposed therebetween, and an orientation film 203 is provided in such a manner as to cover the pixel electrode 202. A liquid crystal layer 205 is sandwiched between the orientation film 203 on the driving substrate side and a face of an opposing substrate (not shown) on which an orientation film 204 is formed. Further, two polarizing plates 206 and 207 are disposed under crossed Nicols with the substrates sandwiched therebetween. Here, the rubbing direction of the two orientation films 203 and 204 coincides with the direction of one of transmission axes of the two polarizing plates 206 and 207. Further, the rubbing direction of the two orientation films 203 and 204 and the transmission axis of one of the polarizing plates 206 and 207 here, the polarizing plate 207 are set so as to be substantially in parallel to the extension direction of the electrode portions 202a of the pixel electrode within a range within which the direction in which liquid crystal molecules m rotates is defined.

In the liquid crystal display apparatus of the FFS mode, when no voltage is applied between the common electrode 201 and the electrode portions 202, the axis of liquid crystal molecules m which form the liquid crystal layer 205 is directed perpendicularly to the transmission axis of the polarizing plate 206 on the incidence side but parallelly to the transmission axis of the polarizing plate 207 on the emergence side. Thus, light incident from the polarizing plate 206 comes to the polarizing plate 207 on the emergence side without any phase difference provided thereto by the liquid crystal layer 205 and is absorbed by the polarizing plate 207 thereby to display the black. On the other hand, if a voltage is applied between the common electrode 201 and the pixel electrode 202, then the orientation direction of the liquid crystal molecules m is rotated to an oblique direction with respect to the extension direction of the pixel electrode 202 by an in-plane electric field generated between the common electrode 201 and the pixel electrode 202. Thereupon, the field strength upon white display is optimized so that the axis of the liquid crystal molecules m at a central location in the thicknesswise direction of the liquid crystal layer 205 may exhibit rotation by 45°. Consequently, when the light h incident from the polarizing plate 206 of the incidence side passes through the liquid crystal layer 205, it is converted into linearly polarized light rotated by 90° and passes through the polarizing plate 207 on the emergence side thereby to display the white.

In such a liquid crystal display apparatus of the FFS mode as described above, a plurality of scanning lines 213 and a plurality of signal lines 215 are wired in a matrix along outer peripheral sides of a rectangular display screen of a driving substrate 211, and a pixel electrode 202 is provided at each of intersecting locations of the scanning lines 213 and the signal lines 215. Each pixel electrode 202 is provided in a substantially rectangular outer shape within a pixel region a of a substantially rectangular shape defined by scanning lines 213 and signal lines. The pixel electrodes 202 are patterned in a comb-like shape such that they have a plurality of electrode portions 202a extending in parallel to the major sides of the outer shape as disclosed in Japanese Patent No. 3,742,837.

Another example of a configuration of a pixel electrode is shown in FIG. 15. Referring to FIG. 15, a pixel electrode 202 having a substantially rectangular outer shape is provided in a pixel region a of a substantially rectangular shape defined by scanning lines 213 and signal lines 215 wired along outer peripheral sides of a display screen. A plurality of electrode portions 202a extend obliquely with respect to the outer shape of the pixel region a. The configuration of the pixel electrode just described is disclosed, for example, in U.S. Pat. No. 7,145,621.

Both of the configurations described above with reference to FIGS. 14 and 15 have an optical configuration similar to that described hereinabove with reference to FIG. 13. In short, the rubbing direction of the two orientation films 203 and 204 and the direction of the transmission axis of one of the polarizing plates 206 and 207, in FIG. 13, of the polarizing plate 207, are set substantially in parallel to the pixel electrode 202, that is, the comb-shaped electrode portions 202a.

SUMMARY OF THE INVENTION

Incidentally, where it is intended to use a mobile apparatus which includes any of such liquid crystal display apparatus as described above as a display section thereof, the display section may be observed by a user who wears a pair of sunglasses. In this instance, if, as seen in FIG. 16, the transmission axis of the polarizing sunglasses 300 which is normally set to a horizontal direction as indicated by double-sided arrow marks is directed perpendicularly to the transmission axis of the polarizing plate on the emergence side of the display section, then this gives rise to a problem that the display on the display section cannot be observed by the user.

For example, in the display apparatus of the configuration described above with reference to FIG. 14, the comb-shaped electrode portions 202a extend in parallel to the outer peripheral sides of the display screen of the driving substrate 211, and the rubbing directions of the orientation films 203 and 204 and the transmission axis of the polarizing plate 207 on the emergence side are set so as to extend substantially in parallel to the direction of the electrode portions 202a. Therefore, the transmission axis of the polarizing plate 207 on the emergence side extends substantially perpendicularly to the transmission axis of the polarizing sunglasses, and consequently, the problem of the mismatch with the polarizing sunglasses described above occurs. Also in an alternative configuration wherein the transmission axes of the polarizing plates 206 and 207 rotate by 90°, if the display section is rotated by 90° on a mobile apparatus of the landscape type in recent years, then since the transmission axis of the polarizing plate 207 on the emergence side becomes perpendicular similarly as described above, a similar problem occurs.

In order to prevent occurrence of such problems as described above, it seems a possible idea to modify the display apparatus of the configuration shown in FIG. 14 such that the rubbing direction of the orientation films 203 and 204 and the transmission axes of the polarizing plates 206 and 207 are displaced to oblique directions with respect to the comb-shaped electrode portions 202a, that is, with respect to the outer peripheral sides of the display screen. However, if such a modified configuration as just described is adopted, then the transmission factor of the display apparatus itself drops. FIG. 17 illustrates the transmission factor with respect to the angle of rotation where the rubbing directions of the orientation films and the transmission axes of the polarizing plates are rotated to oblique directions with respect to the comb-shaped electrode portions 202a. From the graph of FIG. 17, it can be recognized that, as the amount of displacement in angle of rotation of the rubbing directions of the orientation films and the transmission axes of the polarizing plates with respect to the comb-shaped electrode portions 202a increases, the light transmission factor upon white display decreases. This arises from the fact that the maximum angle of rotation of liquid crystal molecules by application of an in-plane electric field decreases from 45° at which the highest transmission factor is obtained.

On the other hand, in the liquid crystal display apparatus of the configuration shown in FIG. 15, the comb-shaped electrode portions 202a extend obliquely with respect to the outer peripheral sides of the display screen, and the rubbing directions of the orientation films 203 and 204 and the transmission axis of the polarizing plate 207 on the emergence side are set substantially in parallel to the electrode portions 202a. Therefore, the transmission axis of the polarizing plate 207 on the emergence side is originally oblique with respect to the outer peripheral sides of the display screen, and such a problem where polarizing sunglasses are used as described above is less likely to occur. However, a display apparatus of such a configuration as just described involves a region A within which the two electrode portions 202a do not extend in parallel to the outer peripheral sides, particularly the major sides, of the pixel electrode 202. Such a region A as just described becomes an orientation failure region within which, even if a voltage is applied between the electrodes, liquid crystal molecules cannot be rotated sufficiently to a perpendicular direction to the electrode portions 202a. This makes a factor of decrease of the transmission factor.

Therefore, it is demanded to provide a display apparatus wherein the transmission axis of a polarizing plate on the emergence side can be set to an oblique direction with respect to the outer peripheral sides of a display screen without lowering the transmission factor so that bright display can be achieved and besides mismatch with polarizing sunglasses does not occur.

According to an embodiment of the present invention, there is provided a display apparatus including a liquid crystal panel including a pair of substrates and a liquid crystal layer sandwiched between the substrates, a polarizing plate provided on the side of the liquid crystal panel from which display light is to be extracted, and a common electrode and a plurality of pixel electrodes disposed in an insulating state on a face of one of the substrates adjacent the liquid crystal layer, the polarizing plate being disposed such that a transmission axis thereof extends obliquely with respect to outer peripheral sides of a display screen, each of the pixel electrodes having a substantially quadrilateral outer shape which has two major sides which extend substantially in parallel or substantially perpendicularly to the transmission axis of the polarizing plate, each of the pixel electrodes having a plurality of electrode portions which extend in parallel to the major sides of the outer shape of the pixel electrode in the outer shape.

In the display apparatus, the major sides of the outer shape of each pixel electrode extend substantially in parallel or substantially perpendicularly to the transmission axis of the polarizing plate disposed obliquely with respect to the outer peripheral sides of the display screen. The pixel electrode has the plural electrode portions extending in parallel to the major sides of the outer shape thereof. Therefore, display of a high transmission factor is carried out in a state wherein the angle of rotation of liquid crystal molecules by application of an in-plane electric field is kept sufficiently great. Further, since the pixel electrode has the plural electrode portions extending in parallel to the major sides of the outer shape thereof, a region in which the two electrode portions do not extend in parallel to each other, that is, an orientation failure region within which liquid crystal molecules are not rotated sufficiently by the in-plane electric field, is not formed along the major sides of the outer shape. Also drop of the transmission factor by orientation failure of the liquid crystal molecules is prevented.

With the display apparatus, the transmission axis of the polarizing plate on the emergence side can be set to an oblique direction with respect to the outer peripheral sides of the display screen without decreasing the transmission factor. Consequently, occurrence of mismatch with polarizing sunglasses can be prevented while bright display can be achieved.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 12A and 12B are a front elevational view and a side elevational view, respectively, showing a portable terminal apparatus to which the embodiments of the present invention are applied such as, for example, a portable telephone set, in an unfolded state, and FIGS. 12C, 12D, 12E, 12F and 12G are a front elevational view, a left side elevational view, a right side elevational view, a top plan view and a bottom plan view, respectively, of the portable telephone set in a folded state;

DETAILED DESCRIPTION OF THE PREFERRED EMBODIMENTS

In the following, the present invention is described in detail in connection with preferred embodiments thereof shown in the accompanying drawings.

First Embodiment

Figure 1:
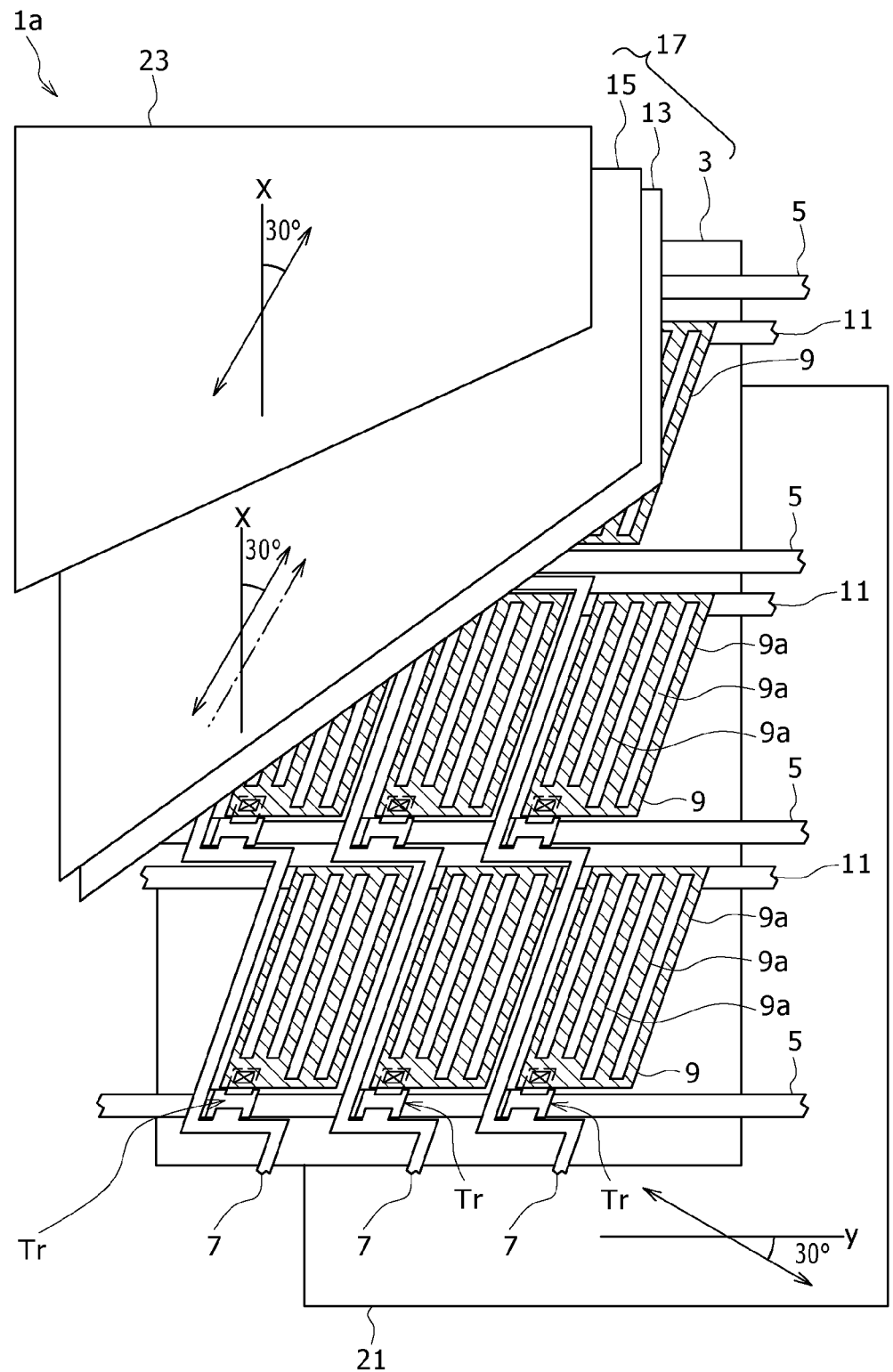
FIG. 1 is a schematic view showing a configuration of a display apparatus according to a first embodiment of the present invention.

FIG. 1 shows a configuration of a display apparatus according to a first embodiment of the present invention. In FIG. 1, an optical axis is indicated by an arrow mark.

Referring to FIG. 1, the display apparatus 1a shown is a liquid crystal display apparatus of the FFS mode and includes a plurality of scanning lines 5 and a plurality of signal lines 7 wired in a matrix along outer peripheral sides of the display screen on a driving substrate 3. A pixel electrode 9 having such a characteristic shape in the first embodiment as hereinafter described is provided at each of intersecting locations of the scanning lines 5 and the signal lines 7. Each pixel electrode 9 is patterned in a comb shape and connected to a scanning line 5 and a signal line 7 through a transistor Tr for switching.

Though not shown, a common electrode which is common to the pixels is provided on the driving substrate 3, and pixel electrodes 9 are disposed in a laminated relationship on the common electrode with an insulating film (not shown) interposed therebetween. The common electrode is connected to common wiring lines 11 provided in parallel to the scanning lines 5, for example, in the same layer as the scanning line 5. The common wiring lines 11 may be provided as a full film over an overall area only in any layer which is lower than that of the pixel electrodes 9 and different from those of the scanning line 5 and the signal line 7. In this instance, there is no necessity to provide the common wiring lines 11.

An orientation film 13 is provided on the driving substrate 3 in such a manner as to cover the pixel electrodes 9. A liquid crystal display panel 17 is provided between the orientation film 13 on the driving substrate 3 side and a face of a counter substrate (not shown) on which another orientation film 15 is formed in such a manner that a liquid crystal layer (not shown) is sandwiched therebetween. The liquid crystal layer is formed from liquid crystal molecules having positive or negative dielectric anisotropy. Further, the orientation films 13 and 15 are provided such that the orientation processing direction such as, for example, the rubbing direction is oblique by an angle of rotation of 5° or more with respect to the outer peripheral sides of the display screen.

It is to be noted that the rectangular outer profile of the driving substrate 3 and the orientation films 13 and 15 in FIG. 1 corresponds to the outer peripheral shape of the display screen. Here, the orientation directions of the orientation films 13 and 15 are set such that they extend anti-parallelly, for example, at an angle of 30° in the counterclockwise direction with respect to the vertical direction x of the display screen.

Two polarizing plates 21 and 23 are disposed under crossed-Nicols on the opposite side faces of the liquid crystal display panel 17 wherein the liquid crystal layer is sandwiched between the orientation films 13 and 15 between the driving substrate 3 and the opposing substrate. The polarizing plates 21 and 23 are provided in such a manner that the transmission axis of one of them coincides with the orientation direction of the orientation films 13 and 15. FIG. 1 illustrates a state wherein the transmission axis of the polarizing plate 23 on the emergence side or display side coincides with the orientation direction of the polarizing plates 21 and 23. Consequently, the polarizing plate 23 on the emergence side is set obliquely at an angle of 30° in the clockwise direction with respect to the vertical direction x of the display screen, and the polarizing plate 23 on the incidence side is set obliquely at an angle of 30° in the counterclockwise direction with respect to a horizontal direction y of the display screen.

Now, the configuration of the pixel electrode 9 provided on the display apparatus 1a wherein the orientation films 13 and 15 and the optical axes of the polarizing plates 21 and 23 are set in such a manner as described above is described.

The pixel electrode 9 is a comb-shaped pixel electrode and is patterned so as to have an outer shape substantially of a parallelepiped. The two major sides which compose the outer shape of the pixel electrode 9 extend substantially in parallel to the orientation direction of the orientation films 13 and 15 and the transmission axis of the polarizing plate 23. Further, the pixel electrode 9 is characterized in that a plurality of electrode portions 9a which form the comb-shaped portion of the pixel electrode 9 extend substantially in parallel to the transmission axis of the polarizing plate 23 and the orientation directions of the orientation films 13 and 15. Consequently, the extension directions of the major sides of the outer shape of the pixel electrode 9 and the electrode portions 9a are set obliquely to an angle of substantially 30° in the clockwise direction with respect to the vertical direction of the display screen of the display apparatus 1a.

It is to be noted that the extension directions of the major sides of the outer shape of the pixel electrode 9 and the electrode portions 9a are substantially in parallel to the orientation directions of the orientation films 13 and 15 and the transmission axis of the polarizing plate 23 while the direction in which liquid crystal molecules m which compose the liquid crystal layer rotate is restricted to one direction. Therefore, the extension directions of the major sides of the outer shape of the pixel electrode 9 and the electrode portions 9a are set so that, for example, they are substantially in parallel while maintaining an angle of approximately ±5° with respect to the orientation directions of the orientation films 13 and 15.

The pixel electrode 9 having such a configuration as described above is provided at each of the intersecting points of the scanning lines 5 and the signal lines 7 wired in a matrix along the outer peripheral sides of the display screen as described above. Therefore, for example, the pixel electrodes 9 are arrayed on the display screen of the display apparatus 1a in a state wherein the minor side direction of the pixel electrodes 9 coincides with the extension direction of the scanning lines 5 and the major side direction of the pixel electrode 9 coincide with the extension direction of the signal lines 7.

However, it is to be noted that the major sides of the outer shape of the pixel electrode 9 are set obliquely to an angle of approximately 30° in the clockwise direction with respect to the vertical direction x of the display screen of the display apparatus 1a. Therefore, where it is not desirable to dispose the signal lines 7 in the display screen, preferably the signal lines 7 are wired in such a shape that they are bent along the outer shape of the pixel electrodes 9 as seen in FIG. 1.

The display apparatus 1a having such a configuration as described above includes the liquid crystal display panel 17 wherein the liquid crystal layer is sandwiched between the orientation films 13 and 15 having a substantially parallel orientation direction with respect to the electrode portions 9a of the comb-shaped pixel electrodes 9, and the two polarizing plates 21 and 23 are disposed on the opposite sides of the liquid crystal display panel 17 under crossed-Nicols wherein the transmission axes thereof extend perpendicularly or in parallel to the orientation directions of the orientation films 13 and 15.

Figure 13:
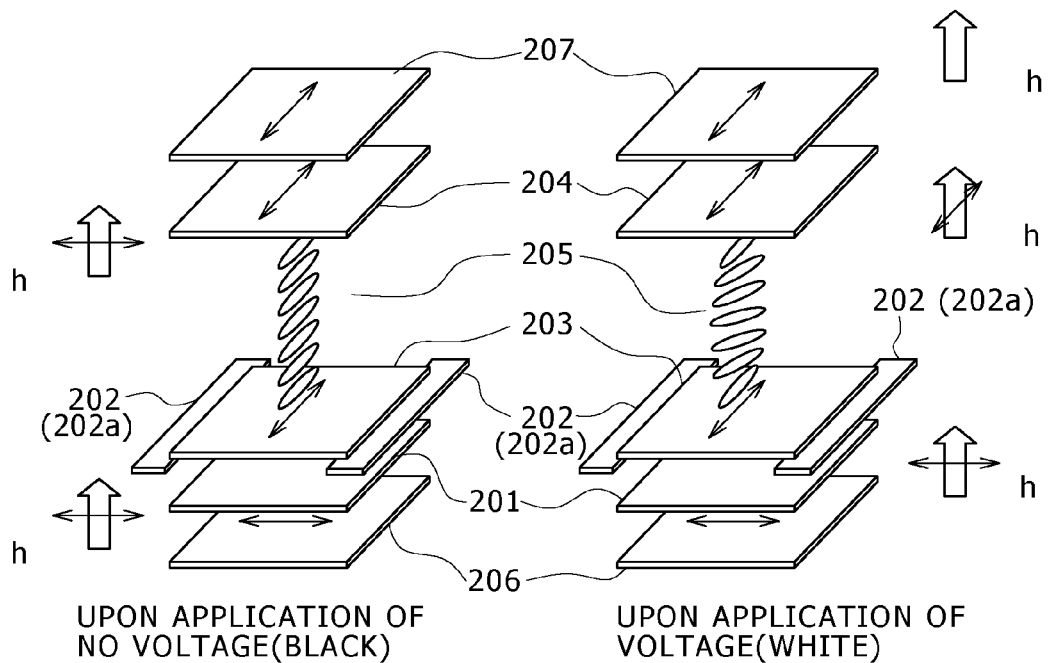
FIG. 13 is a schematic perspective view illustrating operation of a liquid crystal display apparatus of the FFS mode.

Therefore, operation of the display apparatus 1a is similar to that of a popular liquid crystal display apparatus of the FFS mode described hereinabove with reference to FIG. 13. In particular, in a state wherein no voltage is applied between the pixel electrode 9 and the common electrode, the axis of liquid crystal molecules which form the liquid crystal layer is oriented in parallel to the transmission axis of the polarizing plate 21 on the incidence side and the transmission axis of the polarizing plate 23 of the emergence side. Therefore, light incident from the polarizing plate 21 of the incidence side reaches the polarizing plate 23 on the emergence side without a phase difference provided by the liquid crystal layer and is absorbed by the polarizing plate 23 thereby to display the black.

On the other hand, in another state wherein a voltage is applied between the pixel electrode 9 and the common electrode, the orientation direction of liquid crystal molecules is rotated to an oblique direction with respect to the extension direction of the electrode portions 9a by an in-plane electric field generated between the electrode portions 9a of the pixel electrode 9. It is to be noted that, in this instance, the gap of the liquid crystal layer is adjusted so that liquid crystal molecules m at a central portion in this thicknesswise direction of the liquid crystal layer 205 may rotate by approximately 45° similarly as in the conventional liquid crystal display apparatus. Consequently, light incident from the polarizing plate 21 on the incidence side is converted into linearly polarized light rotated by 90° when it passes through the liquid crystal layer and then passes through the polarizing plate on the emergence side thereby to display the white.

Particularly, the display apparatus 1a of the present first embodiment is configured such that the major sides of the outer shape of the pixel electrode 9 extend substantially in parallel or substantially perpendicularly with respect to the transmission axis of the polarizing plate 23 disposed obliquely with respect to the outer peripheral sides of the display screen and the orientation directions of the orientation films 13 and 15. Further, the pixel electrode 9 is configured such that it has a plurality of electrode portions 9a extending in parallel to the major sides of the outer shape of the pixel electrode 9. Therefore, display of a high transmission factor is carried out wherein the angle of rotation of liquid crystal molecules is kept great by application of an in-plane electric field between the electrode portions 9a. Then, since the pixel electrode 9 has a plurality of electrode portions 9a extending in parallel to the major sides of the outer shape thereof, a region wherein the two electrode portions 9a are not directed in parallel, that is, in an orientation failure region wherein liquid crystal molecules are not rotated sufficiently by the in-plane electric field, is not formed along the major sides of the outer shape of the pixel electrodes 9. Accordingly, a drop of the transmission factor by orientation failure of liquid crystal molecules can be prevented.

As a result, with the display apparatus 1a of the first embodiment, a configuration wherein, while bright display wherein a high transmission factor is maintained is possible as described above, the transmission axis of the polarizing plate 23 on the emergence side is set obliquely with respect to the display screen is implemented, and occurrence of mismatch with polarizing sunglasses can be prevented.

Second Embodiment

Figure 2:
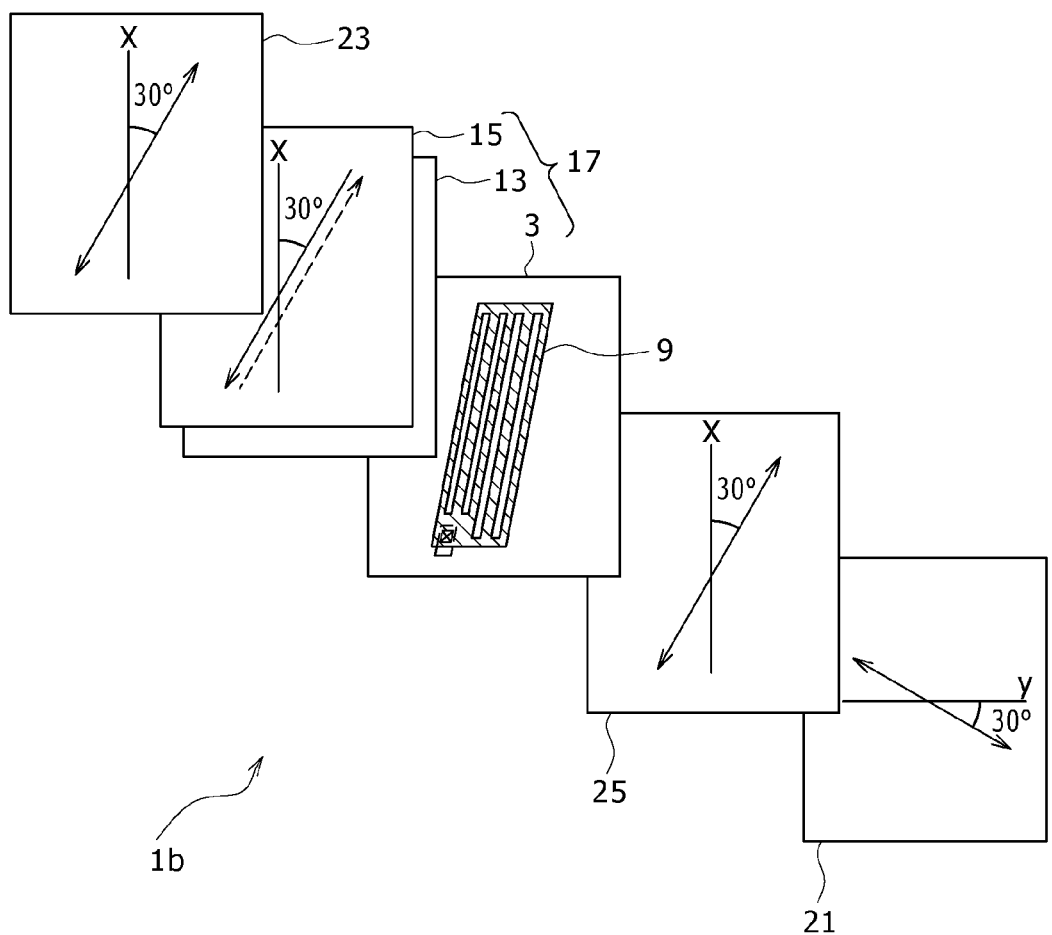
FIG. 2 is a schematic exploded perspective view showing a configuration of a display apparatus according to a second embodiment of the present invention.

FIG. 2 shows a configuration of a display apparatus according to a second embodiment of the present invention. It is to be noted that, in FIG. 2, the configuration of the driving substrate 3 is shown only for one pixel. Further, in FIG. 2, an optical axis is indicated by an arrow mark.

Referring to FIG. 2, the display apparatus 1b of the present second embodiment is same as the display apparatus 1a of the first embodiment except that it additionally includes a phase difference layer 25 between the polarizing plates 21 and 23.

In particular, the additionally provided phase difference layer 25 is for improving the viewing angle characteristic and is provided on one of the opposite faces of the liquid crystal display panel 17. Here, the phase difference layer 25 is additionally provided between the liquid crystal display panel 17 and the polarizing plate 21 on the incidence side. It is to be noted that, where the outer face of the liquid crystal display panel 17 is covered with a cover layer, the phase difference layer 25 may be provided on the inner side with respect to the cover layer.

Figure 3:
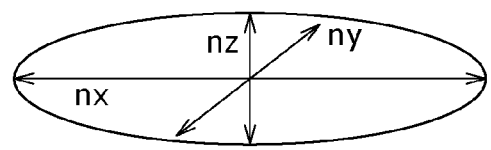
FIG. 3 is a diagrammatic view showing a configuration of a phase difference layer of the display apparatus of FIG. 2.

Since the phase difference layer 25 is provided for improving the viewing angle characteristic, it provides a phase difference of $\lambda/2$ with respect to display light and preferably provides a phase difference within a range of 200 nm to 330 nm. Further, the phase difference layer 25 preferably is configured such that, where the refraction factors in the plane direction are represented by nx and ny and the refraction factor in the film thicknesswise direction is represented by nz as seen in FIG. 3, an Nz coefficient represented by $(nx-nz)/(nx-ny)$ is within a range of approximately 0.3 to 0.7.

It is important to provide the phase difference layer 25 having such a configuration as described above such that the slow axis coincides with the orientation directions of the orientation films 13 and 15.

In the display apparatus 1b which additionally includes such a phase difference layer 25 as described above, the viewing angle characteristic can be expanded in a vertical direction and a horizontal direction of the display screen together with the effects of the first embodiment described hereinabove.

It is to be noted that the present second embodiment can be combined similarly with embodiments hereafter described, and also in this instance, similar effects can be achieved.

Third Embodiment

Figure 4:
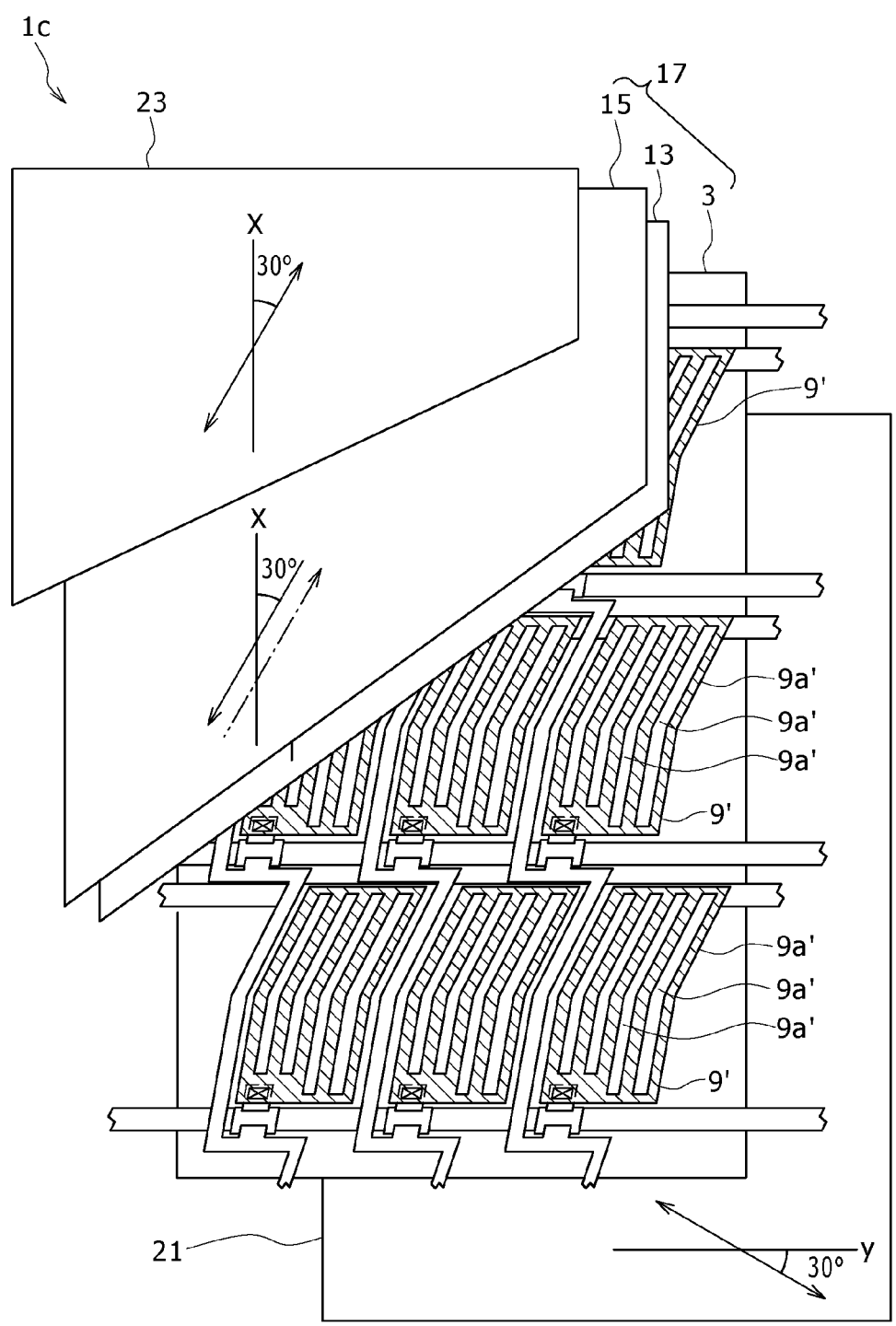
FIG. 4 is a schematic view showing a configuration of a display apparatus according to a third embodiment of the present invention.

FIG. 4 shows a configuration of a display apparatus according to a third embodiment of the present invention. In FIG. 4, an optical axis is indicated by an arrow mark.

Referring to FIG. 4, the display apparatus 1c of the third embodiment shown is formed as a display apparatus of the multi-domain configuration. The display apparatus 1c is similar to the display apparatus 1a of the first embodiment described hereinabove except the shape of the pixel electrode 9' thereof.

In particular, while the pixel electrode 9' is a comb-shaped pixel electrode similar to that of the first embodiment, the major sides thereof which extend substantially in parallel to the orientation directions of the orientation films 13 and 15 and the transmission axis of the polarizing plate 23 are formed so as to have an outer shape which is bent at a substantially central portion thereof. Also the electrode portions 9a' of the pixel electrode 9' provided in parallel to the major sides has a shape which is bent at a substantially central portion thereof in the extension direction thereof.

Figure 5:
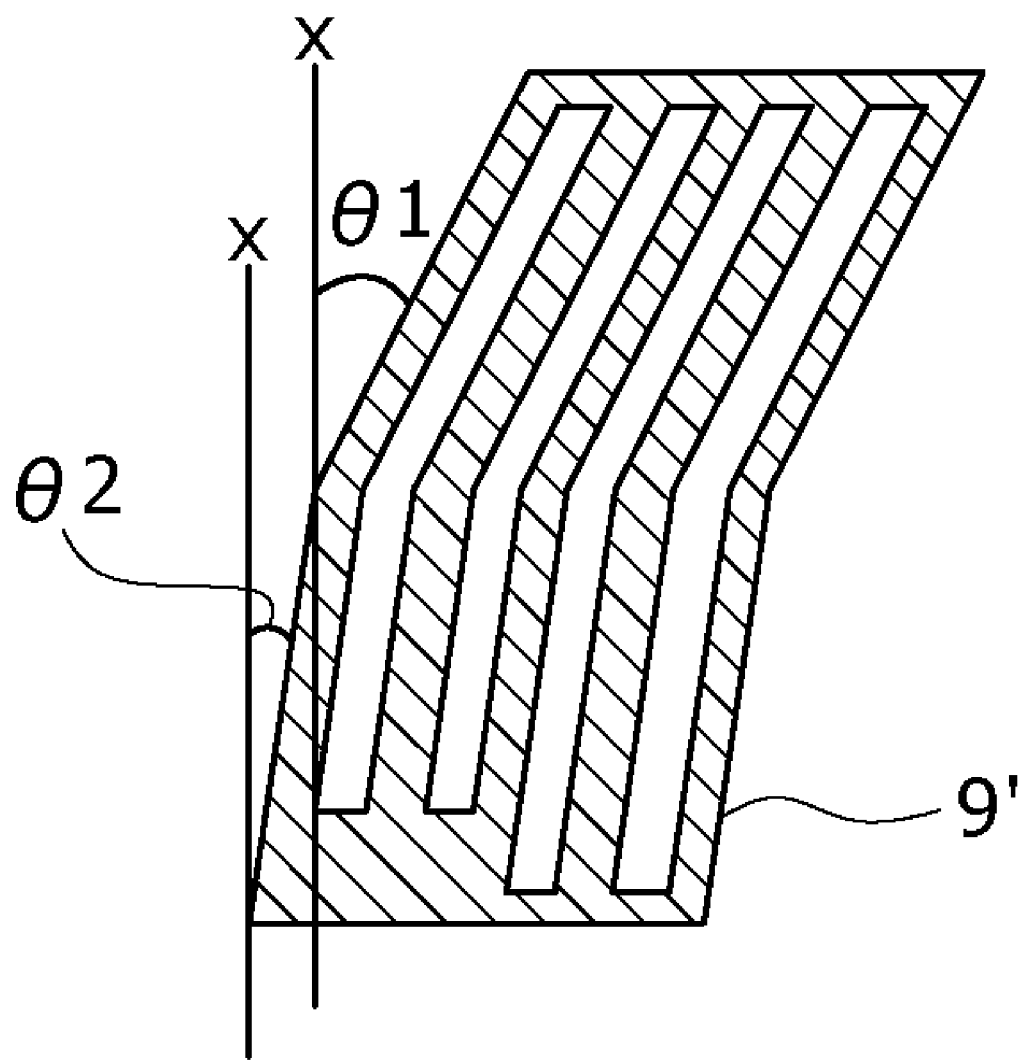
FIG. 5 is a schematic view showing a shape of a pixel electrode of the display apparatus of FIG. 4.

Here, as seen in FIG. 5, each of the major sides of the pixel electrode 9' includes a portion which defines a first angle θ1 with respect to the vertical direction x of the display screen and another portion which defines a second angle θ2. The angles θ1 and θ2 are set such that liquid crystal molecules of the liquid crystal layer extend substantially in parallel to the orientation directions of the orientation films 13 and 15 and the transmission axis of the polarizing plate 23 while they keep an angle within a range within which they rotate in the same direction at the portions which define the angles. Then, only it is necessary for an average angle of the angles θ1 and θ2 to be similar to the arrangement angle of the major sides of the pixel electrode in the first embodiment, and the extension directions of the major sides of the outer shape of the pixel electrode 9 and the electrode portions 9a are set such that the average angle may provide such a parallel state wherein it keeps an angle of approximately ±5° with respect to the orientation directions of the orientation films 13 and 15.

With the display apparatus 1c having such a configuration as described above, similar effects to those of the first embodiment can be achieved on a display apparatus of the multi-domain configuration.

Fourth Embodiment

Figure 6:
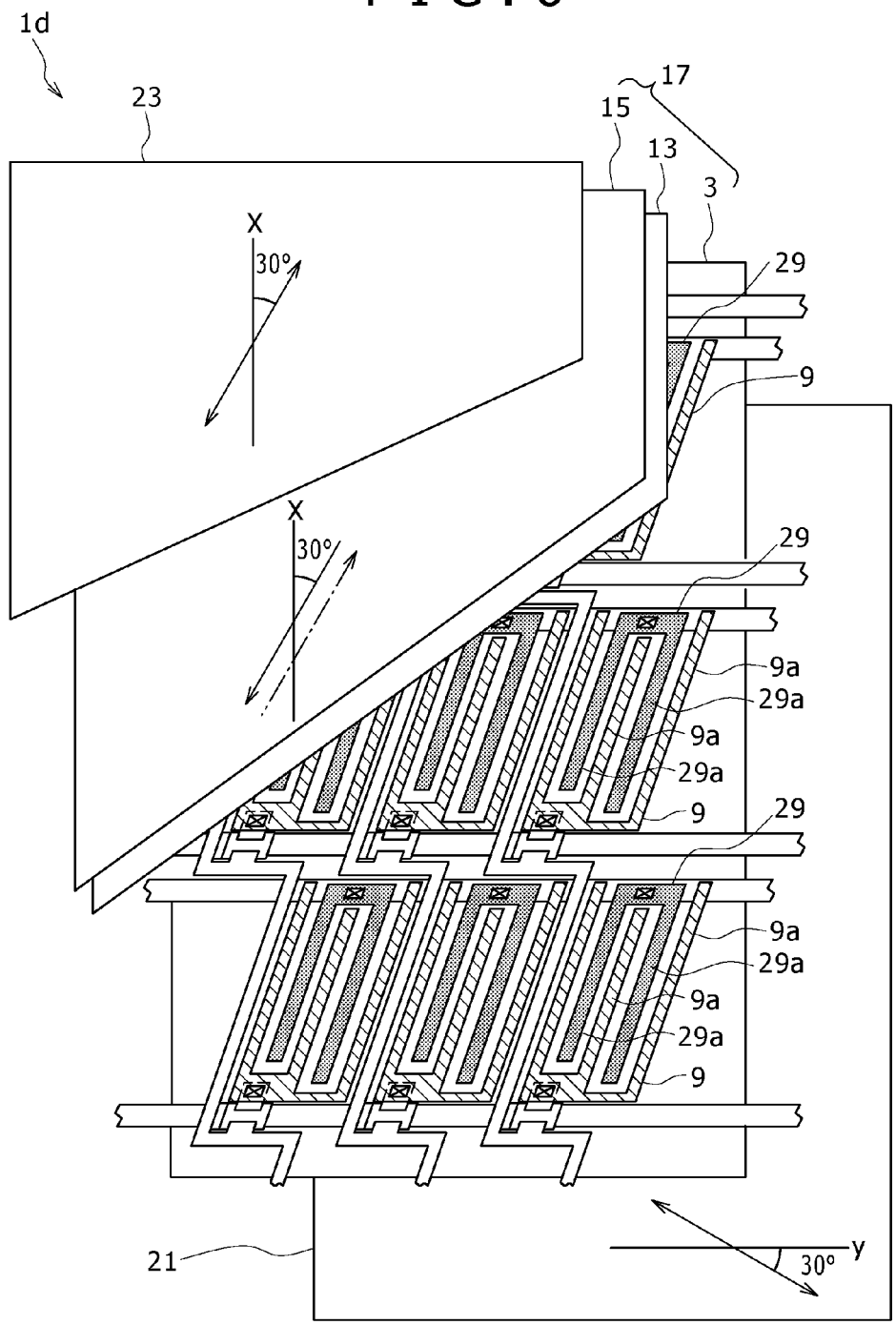
FIG. 6 is a schematic view showing a configuration of a display apparatus according to a fourth embodiment of the present invention.

FIG. 6 shows a configuration of a display apparatus according to a fourth embodiment of the present invention. In FIG. 6, an optical axis is indicated by an arrow mark.

Referring to FIG. 6, the display apparatus 1d of the present fourth embodiment shown is a display apparatus of the IPS mode. The display apparatus 1d is similar to the display apparatus 1a of the first embodiment or the display apparatus 1b of the second embodiment described hereinabove except that a common electrode 29 is provided in the same layer as that of the comb-shaped pixel electrodes 9.

In particular, the common electrode 29 includes comb-shaped common electrode portions 29a disposed between the electrode portions 9a of the comb-shaped pixel electrodes 9. The common electrode portions 29a are disposed in parallel to the electrode portions 9a of the pixel electrode 9 such that an in-plane electric field is generated between the common electrode portions 29a and the electrode portions 9a.

Also with the display apparatus 1d of the IPS mode, effects similar to those of the first embodiment can be achieved.

Fifth Embodiment

Figure 7:
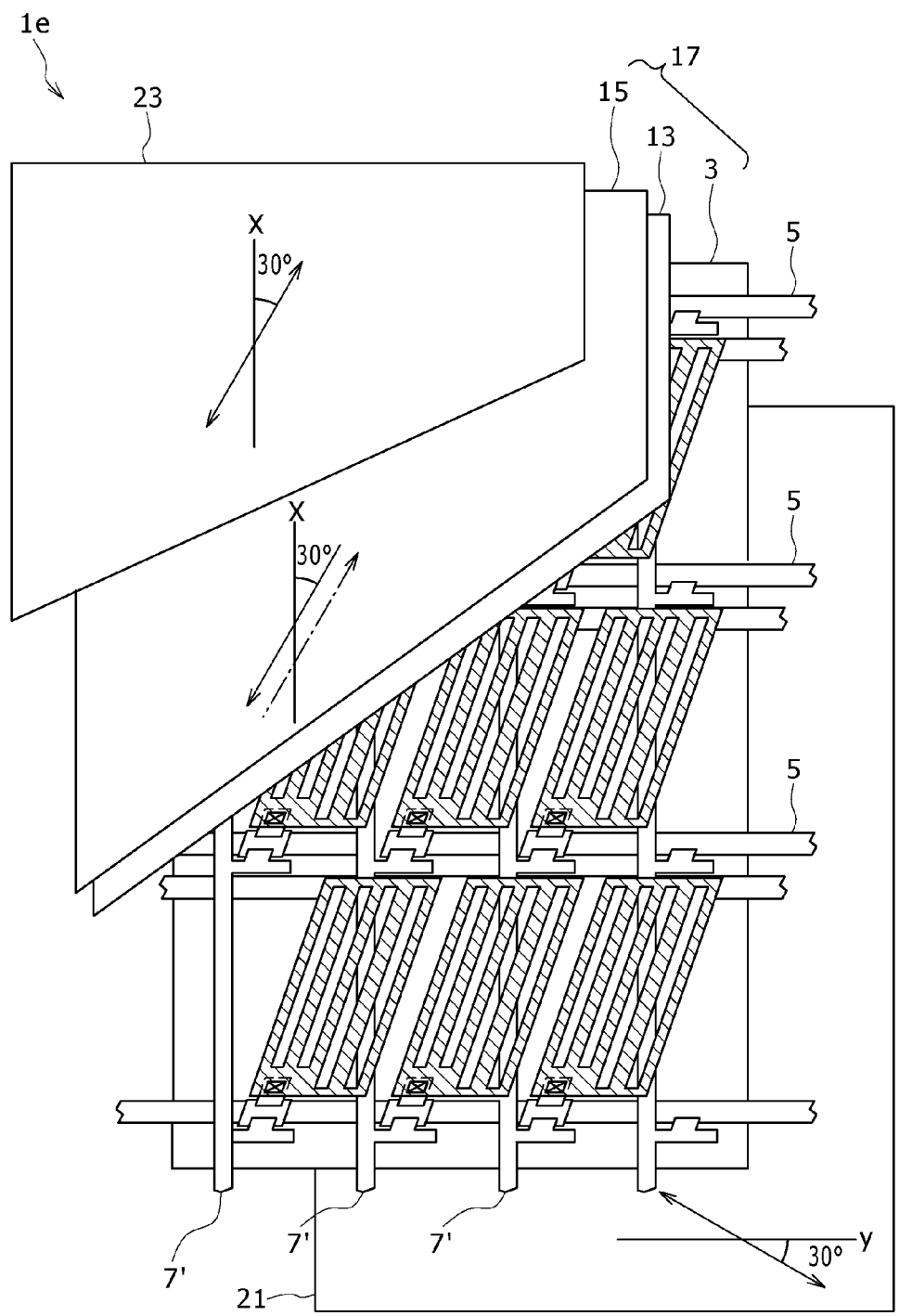
FIG. 7 is a similar view but showing a configuration of a display apparatus according to a fifth embodiment of the present invention.

FIG. 7 shows a configuration of a display apparatus according to a fifth embodiment of the present invention. In FIG. 7, an optical axis is indicated by an arrow mark.

Referring to FIG. 7, the display apparatus 1e of the fifth embodiment shown is a modification to the display apparatus of the first embodiment, wherein the signal lines 7' are disposed linearly along the outer peripheral sides of the display screen. For example, where a transparent conductive material as represented by ITO (Indium Tin Oxide) is used as the material for forming the signal lines 7', the influence of the signal lines 7' on the display is low. Therefore, the signal lines 7' may be wired linearly such that they may overlap with the pixel electrodes 9 as recognized from the present fifth embodiment.

Consequently, in addition to the effects of the first embodiment described hereinabove, the wiring distance of the signal lines 7' themselves is reduced and the driving speed of the display apparatus can be maintained.

It is to be noted that the present fifth embodiment may be combined similarly with second to fourth embodiments described hereinabove, and also in this instance, similar effects can be achieved.

Further, in the first to fifth embodiments described hereinabove, the minor side direction of the pixel electrode 9 coincides with the extension direction of the scanning lines 5 and the major side direction of the pixel electrodes 9 coincide with the extension direction of the signal lines 7. However, also it is possible to use such a configuration that conversely the major side direction of the pixel electrode 9 coincides with the extension direction of the scanning lines 5 while the minor side direction of the pixel electrodes 9 coincides with the extension direction of the signal lines 7. In this instance, the signal lines and the scanning lines described above may be replaced by each other. However, the connection conditions between the signal lines and the scanning lines and between the pixel electrodes 9 and the transistors Tr are maintained similarly. Also with the configuration just described, similar effects can be achieved.

<Applications>

The display apparatus according to the embodiments of the present invention described above can be applied to various electronic apparatus shown as examples in FIGS. 8 to 12G. In particular, the display apparatus can be applied as a display apparatus for electronic apparatus in all fields which display an image signal inputted to the electronic apparatus or an image signal produced in the electronic apparatus as an image such as, for example, portable terminal apparatus such as a digital camera, a notebook type personal computer and a portable telephone set, a video camera and so forth. In the following, particular examples of an electronic apparatus to which the embodiments of the present invention are applied are described.

Figure 8:
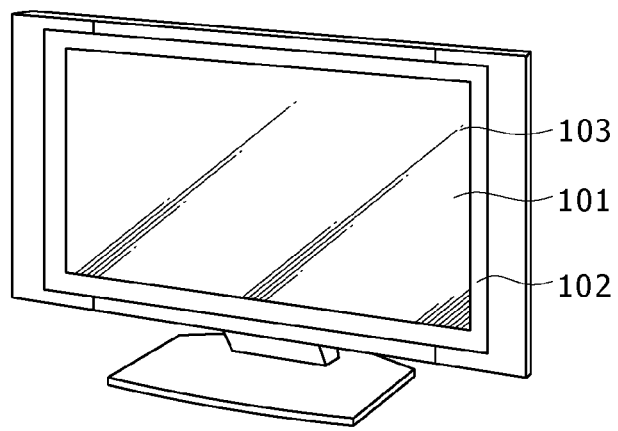
FIG. 8 is a perspective view showing a television receiver to which embodiments of the present invention are applied.

FIG. 8 shows an appearance of a television receiver to which the embodiments of the present invention are applied. Referring to FIG. 8, the television receiver shown includes an image display screen section 101 composed of a front panel 102, a glass filter 103 and so forth. The display apparatus according to the embodiments of the present invention can be used as the image display screen section 101.

Figure 9A:
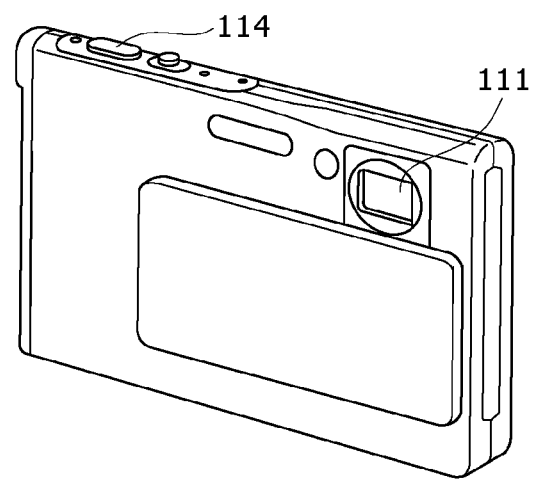
FIGS. 9A and 9B are perspective views of a digital camera to which embodiments of the present invention are applied as viewed from the front side and the rear side, respectively.
Figure 9B:
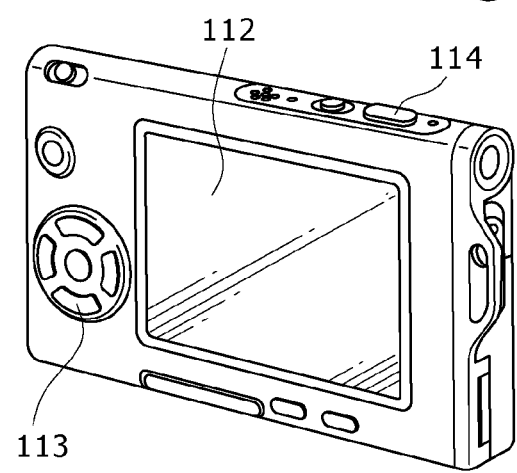

FIGS. 9A and 9B show an appearance of a digital camera to which the embodiments of the present invention are applied as viewed from the front side and the rear side, respectively. Referring to FIGS. 9A and 9B, the digital camera shown includes a light emitting section 111 for emitting flashlight, a display section 112, a menu switch 113, a shutter button 114 and so forth. The display apparatus according to the embodiments of the present invention can be used as the display section 112.

Figure 10:
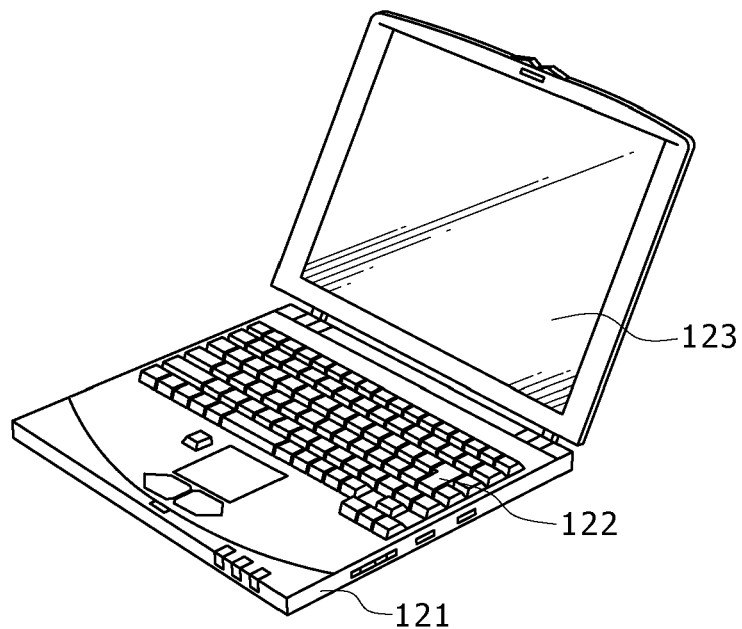
FIG. 10 is a perspective view showing a notebook type personal computer to which the embodiments of the present invention are applied.

FIG. 10 shows an appearance of a notebook type personal computer to which the embodiments of the present invention are applied. Referring to FIG. 10, the notebook type personal computer shown includes a body 121, a keyboard 122 for being operated to input a character or the like, a display section 123 for displaying an image, and so forth. The display apparatus according to the embodiments of the present invention can be used as the display section 123.

Figure 11:
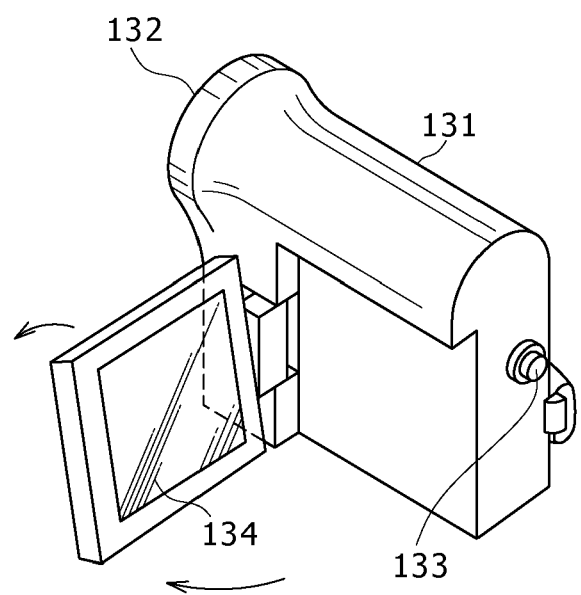
FIG. 11 is a perspective view showing a video camera to which the embodiments of the present invention are applied.

FIG. 11 shows an appearance of a video camera to which the embodiments of the present invention are applied. Referring to FIG. 11, the video camera shown includes a body section 131, a lens 132 provided on a forwardly directed face of the body section 131 for picking up an image of an image pickup object, a start/stop switch 133 for being operated to start or stop image pickup, a display section 134 and so forth. The display apparatus according to the embodiments of the present invention can be used as the display section 134.

FIGS. 12A to 12G show an appearance of a portable terminal apparatus such as, for example, a portable telephone set to which the embodiments of the present invention are applied. Referring to FIGS. 12A to 12G, the portable telephone set shown includes an upper side housing 141, a lower side housing 142, a connection section 143 in the form of a hinge, a display section 144, a sub display section 145, a picture light 146, a camera 147 and so forth. The display apparatus according to the embodiments of the present invention can be used as the display section 144 or the sub display section 145.

WORKING EXAMPLES

The display apparatus according to the embodiments of the present invention described above and display apparatus of comparative examples were fabricated in such a manner as described below, and the transmission factor of the display apparatus was measured.

Working Example 1

A display apparatus 1a similar to that of the first embodiment described hereinabove with reference to FIG. 1 was fabricated. The transmission axis of the polarizing plate 23 and the orientation direction of the orientation film 13 with respect to the vertical direction x of the display screen were displaced by an angle of rotation of 30°. Further, the extension directions of the major sides of the pixel electrodes 9 and the electrode portions 9a were set substantially in parallel to the transmission axis of the polarizing plate 23 and the orientation direction of the orientation film 13 within a range within which liquid crystal molecules were rotated in the same direction upon voltage application.

Working Example 2

A display apparatus 1c similar to that of the third embodiment described hereinabove with reference to FIG. 4 was fabricated. The transmission axis of the polarizing plate 23 and the orientation direction of the orientation film 13 with respect to the vertical direction x of the display screen were displaced by an angle of rotation of 30°. Further, the extension directions of the major sides of the pixel electrodes 9 and the electrode portions 9a were set substantially in parallel to the transmission axis of the polarizing plate 23 and the orientation direction of the orientation film 13 within a range within which liquid crystal molecules were rotated in the same direction upon voltage application between the portion of the first angle $\theta 1$ and the portion of the second angle $\theta 2$.

Comparative Example 1

A conventional display apparatus of the configuration described hereinabove with reference to FIG. 14 was fabricated. The extension directions of the major sides of the pixel electrodes and the electrode portions with respect to the transmission axis of the polarizing plate and the orientation direction of the orientation film were set parallel to each other within a range within which liquid crystal molecules rotate in the same direction upon voltage application.

Comparative Example 2

In the display apparatus of the comparative example 1, only the transmission axis of the polarizing plate and the orientation direction of the orientation film were displaced by an angle of rotation of 30°.

Comparative Example 3

A display apparatus of the conventional configuration described hereinabove with reference to FIG. 15 was fabricated. The transmission axis of the polarizing plate and the orientation direction of the orientation film were set so as to be parallel to the vertical direction of the display screen. Further, the extension direction of the electrode portions of the pixel electrodes with respect the transmission axis of the polarizing plate and the orientation direction of the orientation film was set so as to be substantially in parallel within a range within which liquid crystal molecules rotate in the same direction upon voltage application. However, the major sides of the pixel electrodes remained substantially in parallel to the vertical direction of the display screen.

The transmission factor upon white display was measured on the display apparatus fabricated in such a manner as described above. A result of the measurement is illustrated in Table 1 below. In Table 1, the result of the measurement was indicated with respect to 100% provided by the transmission factor of the comparative example 1.

TABLE 1

Figure 14:
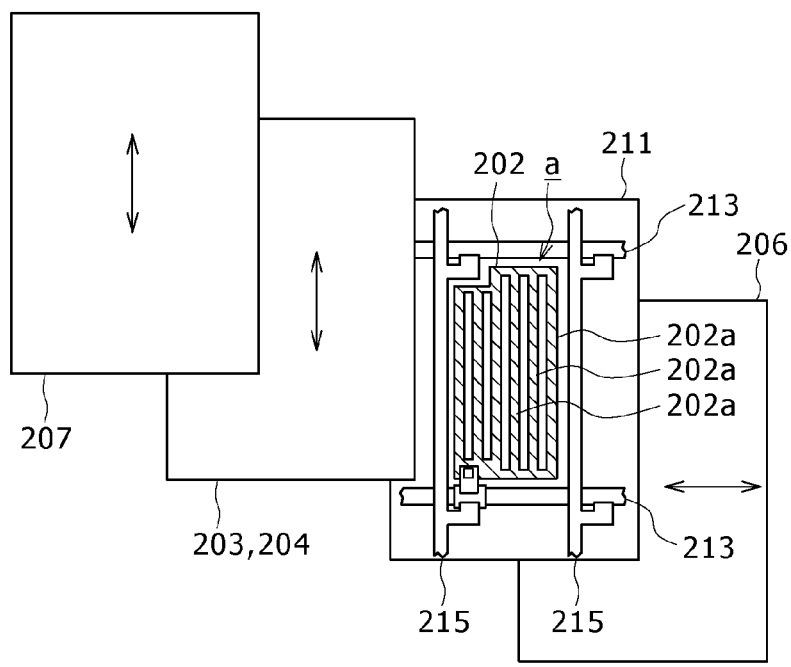
FIG. 14 is an exploded schematic perspective view showing an example of a configuration of a conventional liquid crystal display apparatus.
Figure 15:
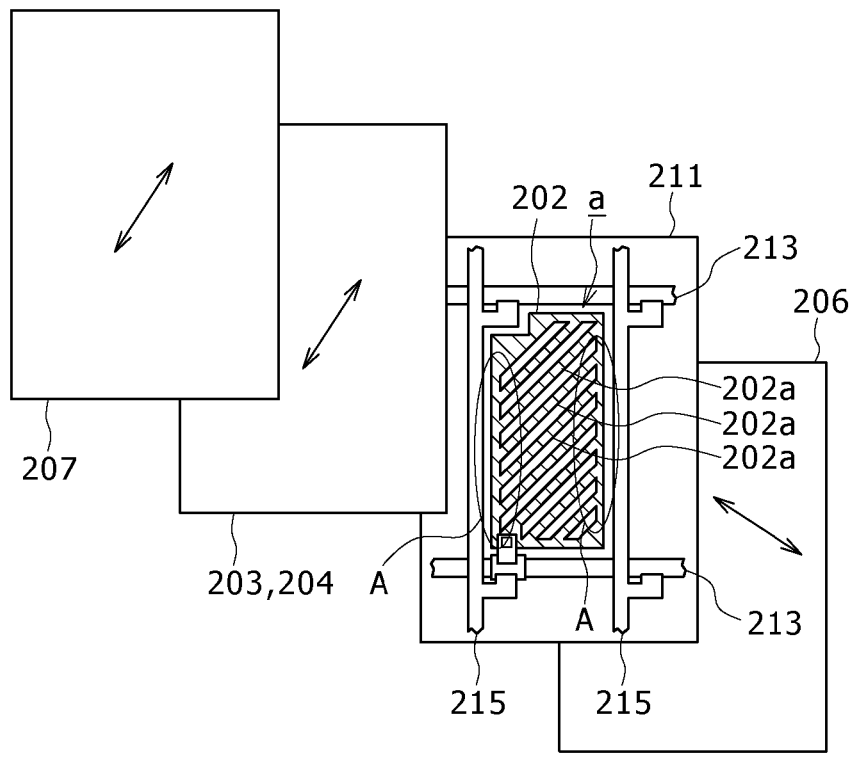
FIG. 15 is an exploded schematic perspective view showing an example of a configuration of another conventional liquid crystal display apparatus.

| | Corresponding figure | Angle of rotation of transmission axis of polarizing plate with respect to display screen | | Transmission factor | Visibility through polarizing sunglasses |
|---|---|---|---|---|---|
| Example 1 | FIG. 1 | 30° | — | 100% | ☺ |
| Example 2 | FIG. 4 | 30° | ($\theta 1 + \theta 2$)/2 | 100% | ☺ |
| Comparative example 1 | FIG. 14 | 0° | — | 100% | X |
| Comparative example 2 | FIG. 14 | 30° | transmission axis and orientation film | 80% | ☺ |
| Comparative example 3 | FIG. 15 | 30° | — | 80% | ☺ |

Figure 16:
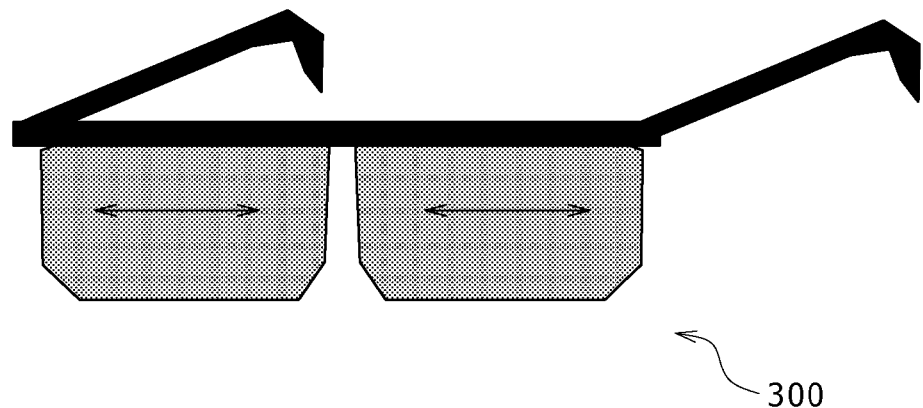
FIG. 16 is a view showing polarizing sunglasses.
Figure 17:
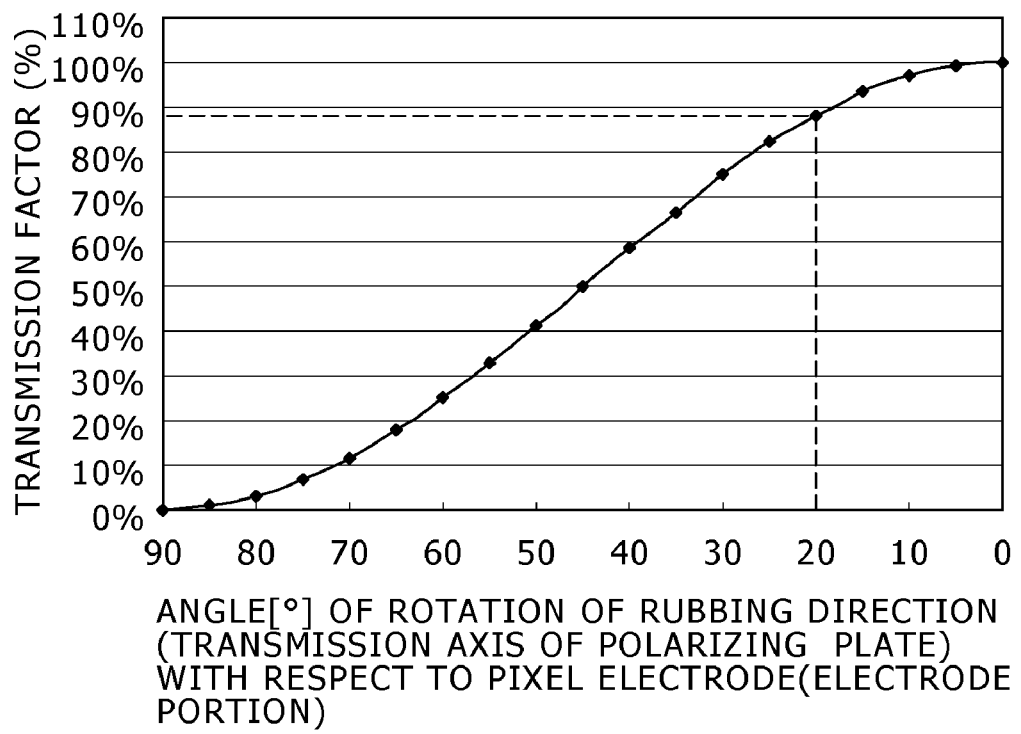
FIG. 17 is a graph illustrating the transmission factor with respect to the angle of rotation of the rubbing direction of pixel electrodes and the directions of the transmission axes of polarizing plates.

As seen from Table 1 above, it was confirmed that, in the display apparatus of the examples 1 and 2 to which the present invention is applied, even if the transmission axis of the polarizing plate is rotated with respect to the display screen, the transmission factor upon white display can be maintained as high as that of the comparative example 1 wherein the transmission axis of the polarizing plate is set in parallel to the display screen. Further, in the display apparatus of the examples 1 and 2 to which the present invention is applied, since the transmission axis of the polarizing plate is rotated with respect to the display screen, the display can be observed well through such polarizing sunglasses as shown in FIG. 16.

Examples 3 to 8

In the display apparatus 1a similar to that of the first embodiment described hereinabove with reference to FIG. 1, the transmission axis of the polarizing plate 23 and the orientation direction of the orientation film 13 with respect to the vertical direction x of the display screen were displaced to several angles of rotation from 0° to 45°. Further, the extension directions of the major sides of the pixel electrode 9 and the electrode portions 9a with respect to the transmission axis of the polarizing plate 23 and the orientation direction of the orientation film 13 were set so as to be substantially parallel within a range within which liquid crystal molecules are rotated in the same direction upon voltage application. The angles of rotation are such as illustrated in Table 2 given below.

TABLE 2

|  | Visibility through polarizing sunglasses | Angle of rotation of transmission axis of polarizing plate with respect to display screen |
| --- | --- | --- |
| Example 3 | 0° | X |
| Example 4 | 3° | X |
| Example 5 | 5° | ◯ |
| Example 6 | 20° | ◯ |
| Example 7 | 30° | ⊚ |
| Example 8 | 45° | ⊚ |

When the display of the individual display apparatus fabricated in such a manner as described above was observed through such polarizing sunglasses as described hereinabove with reference to FIG. 16, it was confirmed that the display can be observed well at the angles of rotation equal to or greater than 5° and the display can be observed still better at the angles of rotation equal to greater than 30°.

While preferred embodiments of the present invention have been described using specific terms, such description is for illustrative purpose only, and it is to be understood that changes and variations may be made without departing from the spirit or scope of the following claims.

What is claimed is:

1. A display apparatus, comprising:
a liquid crystal panel including a pair of substrates and a liquid crystal layer sandwiched between said substrates;
a polarizing plate provided on the side of said liquid crystal panel from which display light is to be extracted; and
a common electrode and a plurality of pixel electrodes disposed in an insulating state on a face of one of said substrates adjacent said liquid crystal layer;
said polarizing plate being disposed such that a transmission axis of said polarizing plate extends obliquely with respect to outer peripheral sides of a display screen;
each of said pixel electrodes having a substantially quadrilateral outer shape which has two major sides which extend substantially in parallel or substantially perpendicularly to the transmission axis of said polarizing plate, each of said pixel electrodes having a plurality of pixel electrode portions which extend in parallel to the major sides of the outer shape of the pixel electrode,
wherein,
said common electrode is disposed in a layer same as that of said pixel electrodes and has a common electrode portion disposed so as to extend in parallel to said pixel electrode portions, and
said common electrode is contained within boundaries defined by the major sides of the pixel electrode that form the outer shape.

2. The display apparatus according to claim 1, wherein, when no voltage is applied to said liquid crystal layer, liquid crystal molecules which form said liquid crystal layer are oriented substantially in parallel to the extension direction of said electrode portions within a range within which, when a voltage is applied to said liquid crystal layer, the direction of rotation of the liquid crystal molecules is defined.

3. The display apparatus according to claim 1, wherein said pixel electrode is laminated on the side of said common electrode adjacent said liquid crystal layer with an insulating layer interposed therebetween.

4. The display apparatus according to claim 1, further comprising an incidence side polarizing plate disposed under crossed-Nicols with respect to said polarizing plate provided on the side of said liquid crystal panel from which display light is to be extracted, in such a state that said liquid crystal panel is sandwiched between said polarizing plate and said incidence side polarizing plate.

5. The display apparatus according to claim 1, wherein, on said substrate on which said pixel electrodes are provided,
a switching element connected to each of said pixel electrodes is provided and
a scanning line and a signal line for driving said switching element are wired, at least one of said signal line and said scanning line being wired along the outer shape of said pixel electrode.

6. The display apparatus according to claim 1, wherein the transmission axis of said polarizing plate is inclined obliquely by an angle equal to or greater than 5° with respect to the outer peripheral sides of said display screen.

7. The display apparatus according to claim 1, further comprising a λ/2 phase difference layer provided on one of the faces of said liquid crystal panel for improving the viewing angle characteristic.

8. The display apparatus according to claim 1, further comprising:
a scanning line and a signal line for driving a switching element of each of the pixel electrodes, wherein the signal line conforms to the outer shape of the pixel electrodes, the signal line being parallel to the major axis of the quadrilateral outer shape and the signal line being bent at a corner of the pixel electrode.

* * * * *